United States Patent
Fedegari

(10) Patent No.: US 7,311,292 B2
(45) Date of Patent: Dec. 25, 2007

(54) SANITARY DIAPHRAGM VALVE

(75) Inventor: Fortunato Fedegari, Pavia (IT)

(73) Assignee: Fedegari Autoclavi SPA, Albuzzano (Pavia) (IT)

( * ) Notice: Subject to any disclaimer, the term of this patent is extended or adjusted under 35 U.S.C. 154(b) by 0 days.

(21) Appl. No.: 10/523,895

(22) PCT Filed: Aug. 6, 2002

(86) PCT No.: PCT/IT02/00520

§ 371 (c)(1),
(2), (4) Date: Feb. 4, 2005

(87) PCT Pub. No.: WO2004/013524

PCT Pub. Date: Feb. 12, 2004

(65) Prior Publication Data

US 2005/0269533 A1    Dec. 8, 2005

(51) Int. Cl.
F16K 31/00    (2006.01)
(52) U.S. Cl. .................. 251/63.5; 251/331; 251/335.2
(58) Field of Classification Search ............. 251/63.5, 251/63.6, 331, 333, 335.2
See application file for complete search history.

(56) References Cited

U.S. PATENT DOCUMENTS

| 3,134,570 | A | * | 5/1964 | Jarrett | 251/331 |
| 4,819,691 | A |   | 4/1989 | Löfgren et al. | |
| 4,826,132 | A | * | 5/1989 | Moldenhauer | 251/129.17 |
| 4,828,219 | A | * | 5/1989 | Ohmi et al. | 251/118 |
| 4,917,357 | A | * | 4/1990 | Danko | 251/331 |
| 5,152,500 | A | * | 10/1992 | Hoobyar et al. | 251/269 |
| 5,277,401 | A | * | 1/1994 | Butler et al. | 251/144 |
| 5,820,105 | A | * | 10/1998 | Yamaji et al. | 251/368 |
| 6,145,810 | A |   | 11/2000 | Connelly et al. | |

FOREIGN PATENT DOCUMENTS

| EP | 0 072 681 A | 2/1983 |
| EP | 0 508 658 A | 10/1992 |

* cited by examiner

Primary Examiner—John Rivell
Assistant Examiner—John K. Fristoe, Jr.
(74) Attorney, Agent, or Firm—Fredrikson & Byron, P.A.

(57) ABSTRACT

The invention relates to a valve intended in particular for sanitary applications, comprising a body in which there are a first and a second perpendicular duct for the flow of a fluid to be shut off; a closure member acts in the valve body to close and open the first duct. The closure member is constituted by a central core with a flexible, circular ring extending around it and has a head having a diverging profile which closes and opens the first duct as a result of the action of the actuator means.

20 Claims, 4 Drawing Sheets

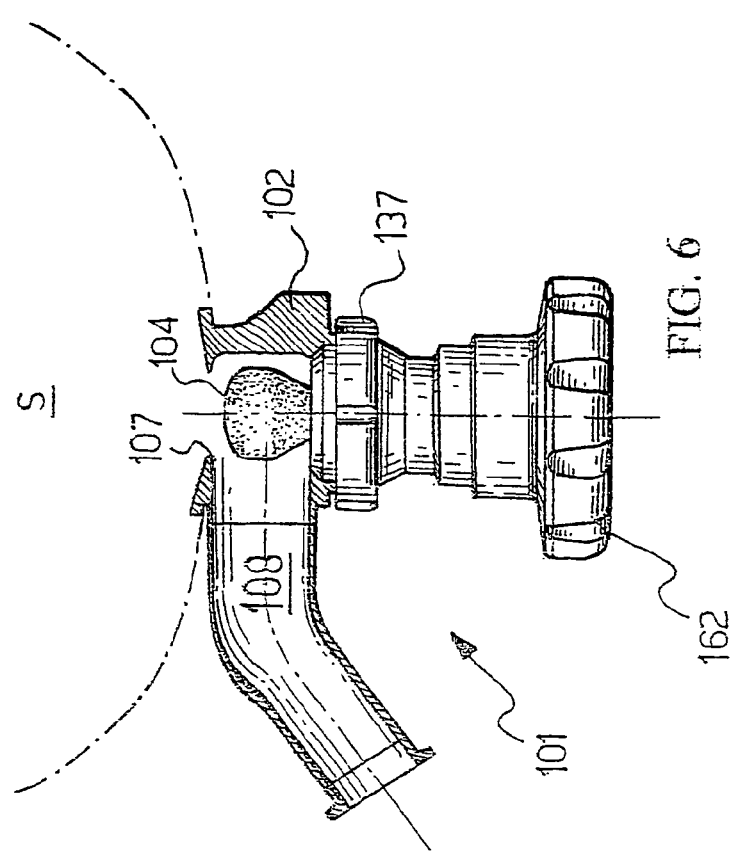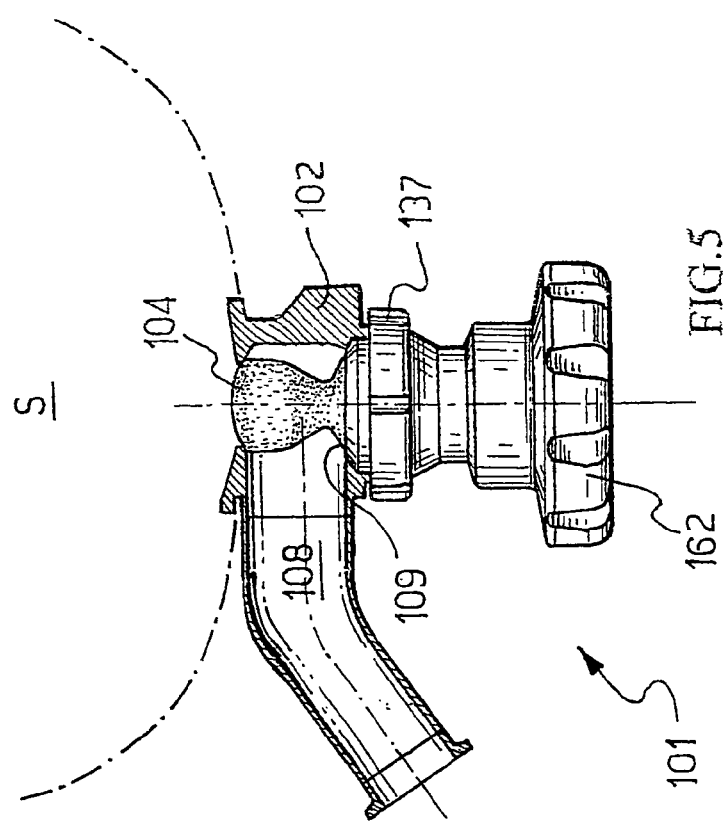

SANITARY DIAPHRAGM VALVE

This is a 371 U.S. National Stage Application No. 10/523,895, filed Feb. 4, 2005, which claims priority to International PCT Application No. PCT/IT2002/000520, filed Aug. 6, 2002, hereby incorporated by reference in its entirety.

FIELD

The invention relates in general to valves for sanitary applications, in which the fluid to be shut off must not be contaminated.

BACKGROUND SECTION

These applications are, in particular, those in the chemical, pharmaceutical and food fields wherein liquid or gaseous fluids circulating in the systems often must have controlled characteristics of sterility, purity, etc., which in any case should not be altered by passage through the valves.

These applications are, in particular, those in the chemical, pharmaceutical and food fields wherein liquid or gaseous fluids circulating in the systems often must have controlled characteristics of sterility, purity, etc., which in any case should not be altered by passage through the valves.

In practice these valves are usually called "diaphragm" or "membrane" valves, because the member which shuts off the fluid is a flexible closure member made of synthetic material (plastics, rubber, etc.) or metal, which physically separates the path of the fluid circulating through the valve from the control members which are disposed outside thereof, so as to prevent any contamination of the fluid caused by external impurities or by contact with the above-mentioned members, with their lubricants, or with the fluids (compressed air or oil) which are used in the actuators for operating the valves.

It should however be pointed out that the closure members may be of many shapes and sizes, so that their definition as "diaphragms" or "membranes" may therefore sometimes be restrictive or in any case somewhat inappropriate for describing their configuration.

A particular aspect of the invention relates especially to valves for shutting off fluids at high temperatures (120-180° C.), and operating with pressures of the order of 5-10 bar, such as the steam which is used in autoclave sterilization systems and the like.

For these valves, it is important that the movement of the closure member be precise and enable the fluid passage port to be closed completely; however, because of the above-mentioned difficult operating conditions, it is not always possible to achieve these results.

For example, in a valve known from European patent No. 508 658 in the name of Asepco, a fluid passage aperture in the valve body is closed by a flexible silicone-rubber membrane wrapped around a head screwed onto the end of an actuator rod which is moved by a hand wheel. This valve ensures an effective seal by virtue of the resilience of the rubber which forms the membrane, since it deforms and adheres well to the edge of the aperture when compressed against it by the actuator head.

The use of a soft and thin material for building up the membrane in these valves, is also rendered necessary by the fact that the membrane has to be fold in a bellows-like manner around the actuator head on which it is fitted.

However, this means that for building the membrane it is necessary to use materials (such as silicone rubber or the like) which inevitably cannot be very strong, particularly at high working temperatures and pressures, so that the membrane in fact has to be replaced quite frequently in these valves thereby requiring more maintenance and longer stoppage times for the plants in which they are installed.

As an alternative to this type of valve there exhist another one in which the closure member is constituted by a slightly curved, flexible disc having a central core formed integrally therewith; this alternative is described in U.S. Pat. No. 6,123,320 in the name of Rasanow et al.

The core has a shank at its rear end, which is coupled with an actuator and, on its front end, a tip with conical geometry; this tip closes the inlet of a first duct for the outlet of the fluid that is to be shut off, which duct is coaxial with the closure-member disc.

Moreover, a second duct parallel to the first one is disposed in an eccentric position in the seat of the valve body which houses the disc closure member.

In contrast with the previous case, this closure member is made of plastic material such as PTFE, EPDM, or the like, which are not soft like the above-described silicone rubber.

In principle, this type of valve is consequently suitable for withstanding the high temperatures and pressures used in the chemical-pharmaceutical field; however, it has some aspects which significantly limit its performance.

First of all, it should be pointed out that the flow ducts of the fluid passage through the valve body (with reference to the drawings of the above-mentioned American patent), on which the disc closure member acts, in practice renders a valve of this type unusable in an upside-down condition with respect to that shown in this patent.

For example, this is the condition of valves applied to the bottom of tanks, containers, or the like and a solution like that disclosed in Rasanow would lead to inevitable stagnation of fluid in a portion of the ducts and on the closure member, so as to cause the deposition thereon of particles which may prejudice the sterility of the plant and of the chemical processes which take place therein.

Moreover, when the fluid enters the valve through the above-mentioned eccentric duct, it enters the seat of the closure member with a jet directed against the closure disc.

However, the disc is a thin element since it must be able to bend in order to comply with the closure and opening movements of the valve, so that in such circumstances it is inevitably subject to frequent breakage, particularly with fluids at high temperature and pressure like those used for the purposes considered above.

In other words, in this case although the plastic material of the disc closure-member is stronger than the silicone rubber used in the Asepco valve, its conditions of use are such that the advantages potentially obtainable with such a material are lost.

The technical problem underlying the invention is therefore that of improving this prior art; it thus aims at providing a diaphragm valve with structural and functional features, such that the closure member can withstand the high pressures and temperatures of the fluids to be shut off, and that stagnation of fluids inside the valve is eliminated even when the valve is mounted upside down, i.e. with the actuator (manual or driven) positioned below the closure member.

This object is achieved by a valve whose characterising features are stated in the claims appended to this description and that will become clearer from the description of a preferred but not exclusive embodiment of the invention, set out hereinafter with reference to the appended drawings, in which:

BRIEF DESCRIPTION OF THE DRAWINGS

FIGS. 5 and 6 show a valve according to the invention applied to the bottom of a tank, in respective operating conditions;

DETAILED DESCRIPTION OF VARIOUS EMBODIMENTS

Figure 1:
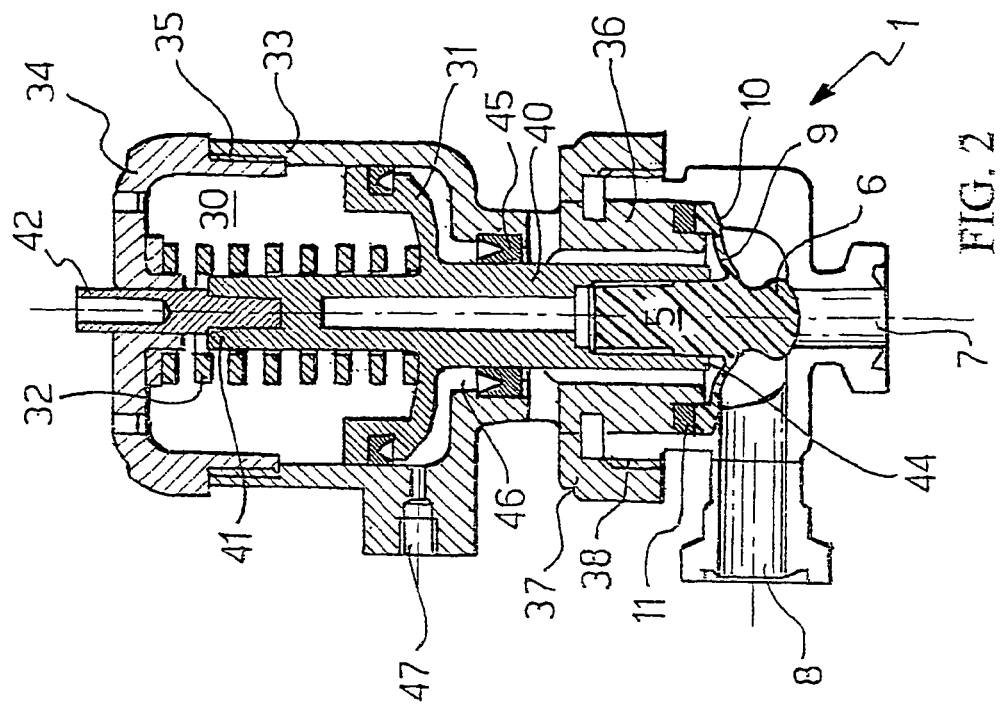
FIG. 1 shows a view with a partial longitudinal section, of a valve with actuator according to the invention.

In the drawings, the valve of this embodiment is generally indicated as 1 and comprises a valve body 2 and a pneumatic actuator 3.

A closure member 4, preferably made of PTFE (polytetrafluoroethylene), Teflon®, EPDM, or similar polymer materials, acts vertically in the valve body 2. As can be seen from the drawings, the closure member 4 has a central core or body 5 which terminates at the front end with a head 6 for engaging an inlet duct 7 of the fluid into the valve; the fluid then leaves the valve through an outlet duct 8 connected to the side of the valve body 2.

Before continuing, it should just be pointed out that in this description and in the appended claims, reference to the ducts 7 and 8 for the inlet or for the outlet of the fluid relates to the direction of flow indicated by the arrows in FIG. 1; clearly, however, this direction could be reversed and the naming of the ducts should then also be adjusted accordingly.

Figure 2:
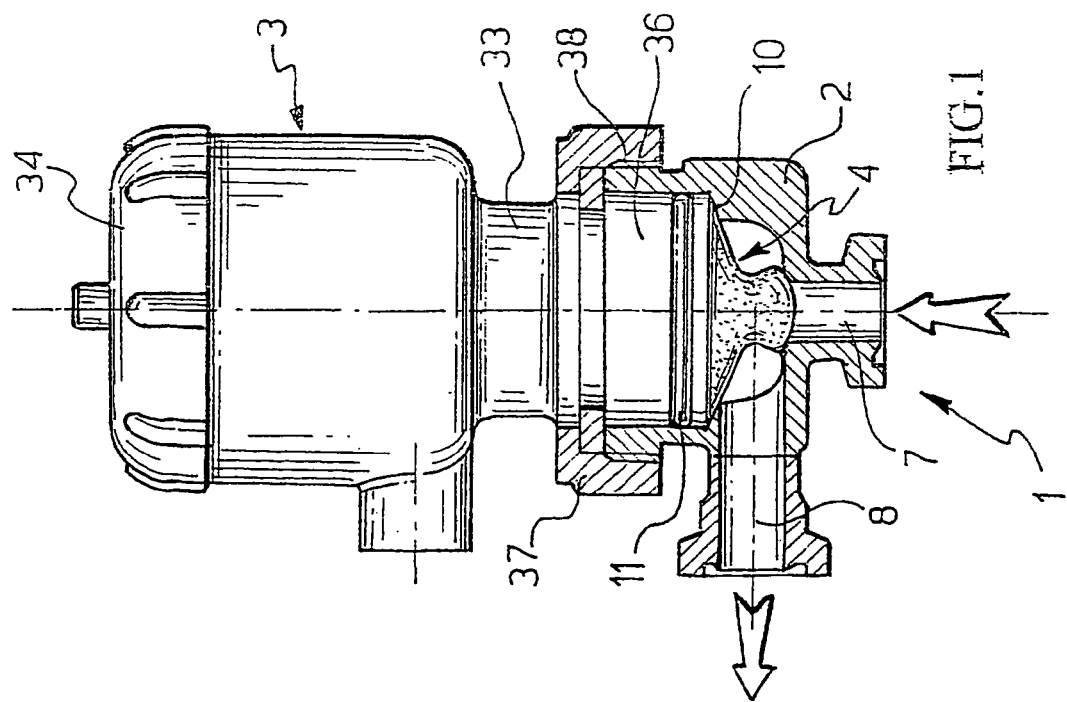
FIG. 2 is a longitudinal section through the valve of the previous figure.

As can be seen, the head 6 has a substantially frustoconical shape, diverging towards its tip, and a circular disc 9 extends at its base; in the rest condition of FIGS. 1 and 2, the disc 9 diverges towards the rear end of the central core 5.

The edge of the disc 9 is kept compressed against an abutment surface 10 of the valve body 2 and, for a better seal, a sealing ring 11 is disposed between the edge of the disc and the actuator 3.

As can be seen from the drawings, the surface of the closure head 6 which comes into contact with the mouth of the duct 7 is slightly rounded; this is to favour contact with the mouth whose edge is chamfered, and to favour the flow of the fluid.

However, this surface could also be flat or configured differently, for example in a manner similar to the profile of the head of the closure member of European patent No. 508 658; however, unlike the latter, in the valve of the invention the closure member is made of material stronger than silicone rubber and has a solid profile, that is, it is not constituted by a membrane wrapped around a shaped support.

In a preferred embodiment the taper of the closure head 6, that is the angle β by which it diverges from the core 5, is between 20° and 45°; moreover, the area of the circular dis 9 in plan, i.e., the area of the circle delimited by its edge which is placed on the abutment surface 10, should preferably be about 10-20% greater than that of the inlet duct 7.

With reference now to the actuator 3, this is of the pneumatic type and comprises a cylindrical chamber 30 in which a piston 31 acts, opposed by a spring 32; according to a preferred embodiment of the invention, the cylindrical chamber 30 is formed in an actuator body 33 of cylindrical geometrical shape, closed at the top by a cover 34 screwed onto a thread 35, the body 33 and the cover 34 being made entirely of plastic material.

The actuator body 33 has a lower tubular connecting portion 36 which is fitted in the valve body 2 until it abuts the sealing ring 10; the actuator body 33 is fixed to the valve body 2, thus coupled, by a ring nut 37 which is screwed externally onto the latter, on a thread 38.

A shaft 40, on which the piston 31 is formed integrally, is mounted coaxially inside the actuator body 33; as described for the actuator body 33 and the cover 34, the shaft 40 and the piston 31 are also made of plastic material so that the part formed thereby is light, strong, inexpensive and can be produced by moulding.

The helical spring 32 is fitted around the portion of the shaft 40 which extends upwards beyond the piston 31 and is in a compressed condition between the cover 34 of the actuator body 33 and the piston 31.

For the adjustment of the spring 32, the upper end 41 of the shaft 40 is advantageously hollow so as to permit engagement by an adjustment pin 42 extending through the cover 34.

Further to being hollow, the lower end 44 of the shaft 40 is also internally threaded so that it can engage a corresponding thread present on the core 5 of the closure member 4 and can transmit thereto the movements brought about by the valve actuator.

In this connection it should be pointed out that, since the actuator is pneumatic, a sealing ring 45 is arranged around the shaft 40 to prevent, on the one hand, leakage of the compressed air which operates the actuator and, on the other hand, possible escape of gas or liquid circulating through the valve, in the event of breakage of the closure member 4; this ring is mounted in a seat 46 in the base of the cylindrical chamber 30.

Finally, the compressed air for the pneumatic operation of the actuator 3 is supplied through a hole 47 in the actuator body 3, into the lower portion of the cylindrical chamber 30.

The operation of the valve according to the invention is clear from the foregoing description.

Indeed, when compressed air or another operating fluid is supplied into the lower portion of the cylindrical chamber 30, the piston 31 moves upwards, overcoming the opposing resilient force exerted by the spring 32 and also moving upwards the closure member 4, connected rigidly to the shaft 40.

In this condition, the head 6 of the closure member is released from the mouth of the inlet duct 7 (see FIG. 3), thereby allowing the fluid to enter the valve body 2 from this duct.

It will be noted that, at this stage, the jet of fluid is directed against the tip of the head 6, which is a thick and hence very strong portion of the closure member, in contrast with its circular disc 9; as a result, there are no problems of breakage of the closure member in this operating condition of the valve.

This conclusion also applies when the direction of circulation of the fluid is reversed with respect to that indicated by the arrows in FIG. 1, that is to say, if the fluid enters from the duct 8 and leaves through the duct 7.

Figure 3:
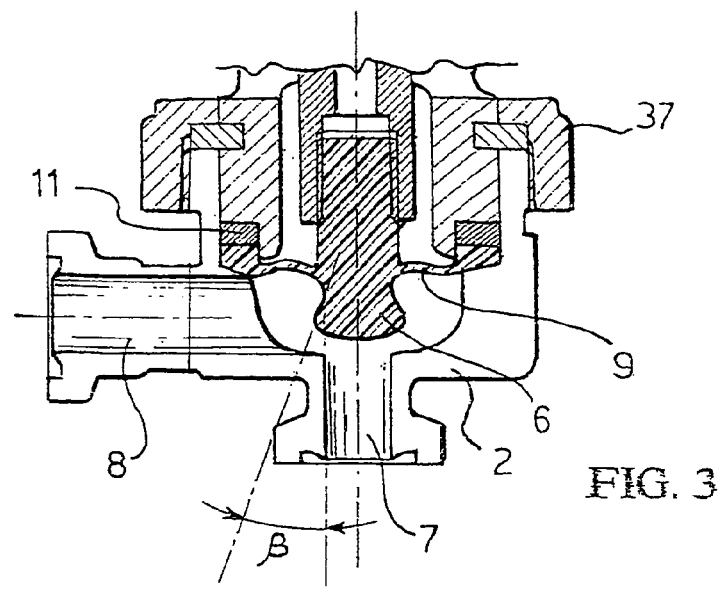
FIG. 3 shows a detail of the previous valve in longitudinal section, in a different operative condition from that of FIG. 2.

Indeed, it can be seen from FIG. 3 that in such operative condition, with the closure member raised, the jet of fluid entering from the duct 8 is directed against the head 6 because the disc 9 bends upwards following the core 5 of the closure member, thereby resulting protected from the erosion which would otherwise be caused by the direct impact of the jet of fluid against it.

In other words, it can be said that in the valve of the invention, the bell-like configuration of the closure member, comprising the head of the central core with the connected disc having its peripheral edge fixed in a position above the duct 8 transverse to the valve body, enables these portions of the closure member to be operated in conditions such as to prevent excessive stresses which could lead to their breakage.

In particular, given that the head 6 is the projecting portion of the solid central core, it constitutes a thick and strong element against which the jet of fluid can be directed without danger, thereby protecting the circular disc which, in contrast, is thin and hence not very strong, from the impact of the jet.

The circular disc 9, on the other hand, acts as a diaphragm which separates the region of the valve through which the fluid flows from the actuator members, thus preventing contamination of the fluid. When, on the other hand, the force exerted by the compressed air on the piston 31 in the cylindrical chamber becomes less than the resilient biasing force of the spring 32, the shaft 40 is urged downwards together with the closure member 4 which closes the inlet duct 7, interrupting the flow of fluid through the valve.

Naturally variants of the invention with respect to the above-described valve embodiment are possible.

Figure 4:
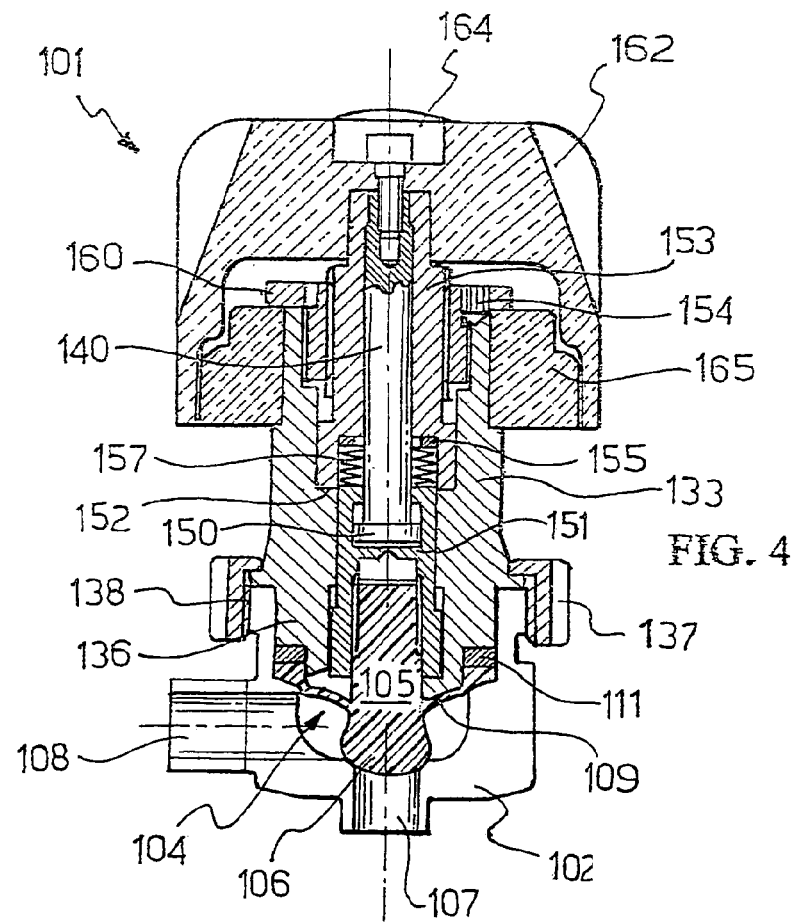
FIG. 4 is a longitudinal section through a manually-operated valve according to the invention.

Indeed it is clear that the same statements made above with regard to the valve 1 with a pneumatic actuator also apply to a manually-operated valve 101 such as that shown in FIG. 4 (for the parts which are structurally or functionally equivalent to those already referred to in the previous embodiment, the same numerals, increased by 100, have been used).

As can be seen, for manual operation the valve again comprises an actuator body 133 engaged in the valve body 102, to which it is fixed by means of the ring nut 137; moreover, the connecting portion 136 of the actuator body 133 is inserted in the valve body 102 until it abuts the sealing ring 111 which bears on the edge of the circular disc 109$b$ of the closure member 104.

In this embodiment since the valve is manually operable, the shaft 140 does not have an operating piston but instead has, at its lower end, a head 150 connected to a collar 151 axially slidable relative thereto; the collar 151 is threaded internally in order to engage a corresponding thread of the core 105 of the closure member.

A sleeve 153, fixed to the shaft 140 in a position above the collar 151, has an external thread 154 and terminates at the bottom in a hollow seat 155 with a diameter matching the outside diameter of the collar to permit their mutual coupling; a group of Belleville washers 157 is disposed in the seat 155.

These washers are in a compressed condition when the closure member 104 of the valve closes the inlet duct 107, whereas they are at rest when the closure member is open; their operation will be explained below.

An internally-threaded bush 160 is fixed in the upper portion of the actuator body 133 and the sleeve 153 is screwed therein; the sleeve 153 is rotated together with the shaft 140, by a hand wheel 162 fixed thereto by means of a screw 164.

In this embodiment, an indicator 165 of the closed/open state of the valve is provided on the outside of the actuator body 133 and is constituted by a coloured circular band which is left exposed to a greater or lesser extent by the hand wheel, according to the extent of screwing-up or unscrewing.

The manually-operated valve thus formed enables a controlled force to be applied to the closure member 104, preventing rapid deterioration thereof due to excessive tightening.

This result is due to the fact that the shaft 140, which is operated by rotation of the hand wheel 162, does not act directly on the closure member 104 but on the set of washers 157; in fact the screwing-up rotations of the shaft 140 and of the sleeve 153 fixed firmly thereto compress the group of washers against the collar 151, urging the collar, and hence also the closure member, downwards.

However, the screwing-up of the shaft and of the sleeve reaches a travel-limit point at a shoulder 152 formed inside the actuator body 133; thus, even if it were desired to rotate the hand wheel 162 further, the shaft 140 would not be able to move beyond the shoulder and the closure member 104 would therefore not be squashed excessively in the valve body 102.

Indeed, the closure member is subject at most to the force produced by the maximum compression of the group of washers 157 when the sleeve 153 reaches the travel limit; this force is in any case limited and can be predetermined by the selection of suitable dimensions for the group of washers 157.

The valve is opened by rotating the hand wheel in the opposite direction to the closure direction, so as to unscrew the sleeve 153 and to move the shaft 140 upwards therewith; this rotation allows the washers 157 to expand and the closure member can thus also be raised, leaving the duct 107 free.

In addition to the results just indicated, in this embodiment the actuator body 133 is again connected directly to the valve body 102, without the presence of covers or intermediate connecting elements, thereby eliminating possible points from which the gas or liquid flowing through the valve might escape in the event of breakage of the closure member 104.

The closure member 104 and the respective valve body 102 in which it is housed are exactly the same as those of the previous embodiment and, with regard to the operation of the head 106 and of the circular disc 109 of the closure member when the fluid passes through the valve body, for brevity, reference should be made to the explanation given above.

Both of the valves of the foregoing embodiments considered can also be used in an inverted position with respect to that in which they are shown in the drawings; for example, these valves may be applied to the bottom of a tank containing a liquid.

In this condition, which is shown in FIGS. 5 and 6, another important advantage afforded by the invention can be appreciated.

As can be seen, the valve 101 of these drawings is of the manually-operated type, and corresponds to that of the last embodiment described, so that the reference numerals have therefore been kept unchanged although, naturally, a servo-valve of the type shown in FIGS. 1-3 could be used instead.

The valve 101 is fitted in the bottom of a tank S, whose shape is shown in chain line, with the closure member 104 closed in FIG. 5 and open in FIG. 6, respectively.

Although in this embodiment the fluid-inlet duct 107 is incorporated in the lower wall of the tank S, the valve operates in the same way described above and reference should therefore once again be made to the explanations already given.

It should however be pointed out here that, when the closure member 104 is closed, since its circular ring 109 is tapered slightly upwards (with reference to FIGS. 5 and 6), it allows the liquid accumulated at the base of the closure member in the stage of emptying the tank S, to pass towards the outlet duct 108.

In other words, during the discharge of the tank (see FIG. 6) the closure member 104 is in a downwardly retracted position and the disc 109 is bent in the manner already explained above with reference to FIG. 3 (naturally in an inverted condition with respect to this drawing), so that upon completion of the emptying of the tank a small deposit of residual liquid is formed in the concave portion of the disc.

If this deposit were not evacuated, it could in some cases contaminate fluid subsequently introduced into the tank; this situation is very important in applications wherein maximum hygiene and safety are required with regard to any potential source of contamination, such as that caused by fluid remaining in the system after use.

The upwardly-tapered configuration of the circular disc 109 however allows that, when the closure member 104 is returned to the closure condition, the residual liquid previously accumulated on the ring passes along it, towards the outlet duct 108; the latter is advantageously formed in a manner such that its internal wall is connected to the profile of the circular ring 109 smoothly, without forming any step which might obstruct the flow of the residual liquid.

It will be noted that this capability to eliminate stagnant fluid when the valve is operating "upside down", is completely absent in the U.S. Pat. No. 6,123,320 cited above since, in that case, the fluid-flow ducts are disposed in the base of the valve, thereby constituting inevitable accumulation points if it is used in an inverted position with respect to that shown in the drawings of this document.

Finally, it should be borne in mind that as a further possible variant of the embodiments described up to now, the valve of the invention may also have more than two ducts, that is, it may hare a number of fluid inlet and/or outlet ducts other than that of the examples given above.

Figure 7:
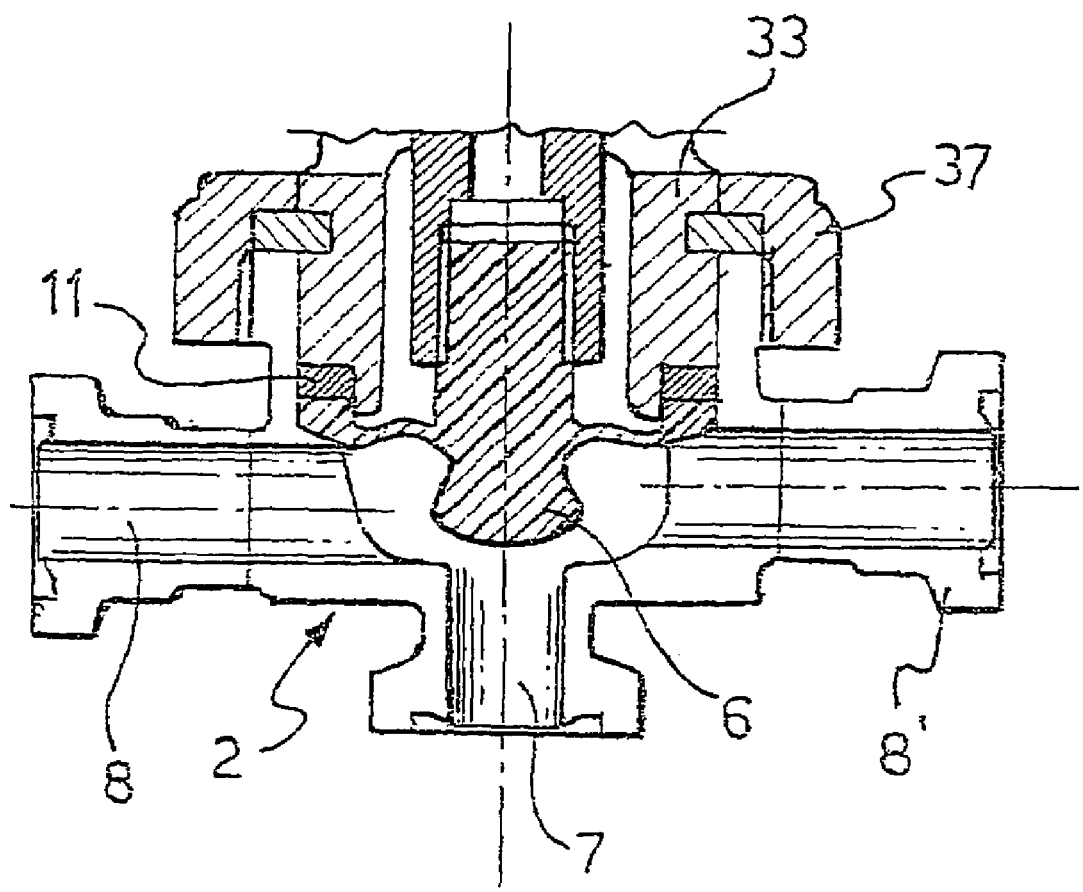
FIG. 7 shows another variant of the valve of the invention.

For greater ease of comprehension, reference is made to a three-way valve such as that of FIG. 7 which, naturally, may be operated manually or by an actuator.

What is claimed is:

1. A shut-off valve comprising:
 (a) a body having a chamber formed therein, the chamber including a first duct and a second duct each extending from the chamber, the chamber and each duct adapted to accommodate a fluid when fed through the body;
 (b) a closure member including a central core, the core having a head oriented toward the first duct, the head having a larger diameter than the first duct and having a convex sealing face with respect to the first duct; and
 (c) a flexible circular disc oppositely disposed from the first duct, the disc integrally formed with the head extending along both sides thereof and peripherally fixed to outer surfaces of the chamber whereby the disc separates in a sealed manner the chamber from an operating means operatively coupled to the body, the closure member selectively positionable in one of an open position and a closed position via the operating means, the convex sealing face of the head disengaged from an inner opening of the first duct in the open position of the closure member thereby permitting free flow of the fluid between the ducts, the convex sealing face of the head engaged with and partially entering the first duct inner opening in the closed position of the closure member thereby preventing the free flow of the fluid between the ducts, the disc having a substantially smooth transition to an internal wall of the second duct in the closed position of the closure member, the valve configured to operate in at least two positions including a first valve position where the head is above the opening of the first duct in an open position of the closure member and a second valve position where the head is below the first duct opening in an open position of the closure member, the substantially smooth transition of the disc in the closed position of the closure member preventing collection of fluid within the chamber regardless of whether the valve is in the first position or in the second position.

2. A valve according to claim 1, wherein the disc includes a portion that is directly connected to the internal wall of the second duct without steps or discontinuities which might obstruct the flow of the fluid along the disc.

3. A valve according to claim 1, wherein the head of the closure member has a configuration diverging from the central core at an angle of between 20° and 45°.

4. A valve according to claim 1, wherein the disc has a surface area that is 10-20% greater than a cross-section of the first duct.

5. A valve according to claim 1, wherein the closure member is made of one of either PTFE, EPDM, or other similar polymer material.

6. The valve of claim 1, wherein the closure member is a one piece member, including both the closure member and the disc.

7. The valve of claim 6, wherein the closure member is made of a flexible plastic material.

8. The valve of claim 1, wherein the first duct is an inlet duct and second duct is an outlet duct.

9. A valve according to claim 8, wherein the second duct is curved downward so as to favor the flow of the fluid from the valve.

10. The valve according to claim 1, wherein the disc extends at a substantially constant slope from the outer surfaces of the chamber across the valve body chamber to the closure member head in the closed position of the closure member.

11. The valve according to claim 1, wherein
 the operating means comprises an actuator body connected to the valve body, wherein the actuator body compresses an edge of the disc oriented away from the chamber against an abutment surface formed in the valve body, and wherein a sealing ring is provided between an edge of the disc and the actuator body, the core of the closure member including an end opposite the head connected to a collar movable axially in the actuator body in opposition to a resilient means compressed between the collar and a threaded sleeve that is movable axially inside the actuator body.

12. A shut-off valve used at a bottom of a tank containing a liquid, comprising:
 (a) a body having a chamber formed therein, the chamber including an inlet duct and an outlet duct with each duct extending from the chamber, the inlet duct extending upwardly from the body to the bottom of the tank;
 (b) a closure member including a central core, the core having a head oriented toward the inlet duct;

(c) a flexible circular disc oppositely disposed from the inlet duct, the disc integrally formed with the head extending along both sides thereof and peripherally fixed to outer surfaces of the chamber whereby the disc separates in a sealed manner the chamber from an operating means operatively coupled to the body, the closure member selectively positionable in one of an open position and a closed position via the operating means, the sealing face of the head disengaged from an inner opening of the inlet duct and being below the inlet duct inner opening in the open position of the closure member thereby permitting free flow of the liquid between the ducts, the sealing face of the head engaged with the inlet duct inner opening in the closed position of the closure member thereby preventing the free flow of the liquid between the ducts, the disc having a substantially smooth transition to an internal wall of the outlet duct in the closed position of the closure member thereby preventing collection of the liquid within the chamber.

13. The valve of claim 12, wherein the disc is directly connected to an internal wall of the outlet duct without steps or discontinuities which might obstruct the free flow of the fluid along the disc.

14. The valve of claim 12, wherein the head has a larger diameter than the inlet duct and has a convex sealing face with respect to the inlet duct thereby limiting collection of the fluid by the head.

15. The valve of claim 14, wherein the sealing face partially enters the inner opening of the inlet duct in the closed position of the closure member.

16. The valve according to claim 12, wherein the outlet duct is curved downward so as to favor the flow of the fluid from the valve.

17. The valve according to claim 12, wherein the disc extends at a substantially constant slope from the outer surfaces of the chamber across the valve body chamber to the closure member head in the closed position of the closure member.

18. A shut-off valve comprising:
(a) a body having a chamber formed therein, the body including first, second, and third ducts each extending from the chamber, the chamber and each duct adapted to accommodate a fluid when fed through the body;
(b) a closure member including a central core, the core having a head oriented toward an inner opening of the first duct, the closure member selectively positionable, via an operating means operatively coupled to the body, in one of an open position with the head disengaged from the inner opening of the first duct and a closed position with the head engaged with the inner opening of the first duct;
(c) a flexible disc integrally formed with the head, the disc diverging away from the head and peripherally fixed to outer surfaces of the chamber whereby the disc seals the chamber from the operating means, the disc having a substantially smooth transition to an internal wall of both the second and third ducts in the closed position of the closure member; and wherein
(d) the shut-off valve is configured to operate in at least two positions including a first valve position where the head is above the opening of the first duct in an open position of the closure member and a second valve position where the head is below the first duct opening in an open position of the closure member, wherein the substantially smooth transition of the disc in the closed position of the closure member prevents the collection of the fluid within the chamber when the shut-off valve is in the second valve position.

19. The valve according to claim 18, wherein the disc extends at a substantially constant slope between the outer surfaces of the chamber and the closure member head in the closed position of the closure member.

20. The valve according to claim 18, wherein the disc bends away from the closure member head in the open position of the closure member so that the disc is outside the path of fluid flowing into the chamber from the second and third ducts.

* * * * *